United States Patent
Roldan

(10) Patent No.: US 12,066,583 B2
(45) Date of Patent: Aug. 20, 2024

(54) METHOD FOR DETECTING SEISMIC EVENTS

(71) Applicant: Kamstrup A/S, Skanderborg (DK)

(72) Inventor: Maria del Carmen Santa-Cruz Roldan, Skanderborg (DK)

(73) Assignee: KAMSTRUP A/S, Skanderborg (DK)

( * ) Notice: Subject to any disclaimer, the term of this patent is extended or adjusted under 35 U.S.C. 154(b) by 301 days.

(21) Appl. No.: 17/558,029

(22) Filed: Dec. 21, 2021

(65) Prior Publication Data

US 2022/0206173 A1   Jun. 30, 2022

(30) Foreign Application Priority Data

Dec. 29, 2020   (EP) .................................... 20217620

(51) Int. Cl.
*G01V 1/28*   (2006.01)
*G01V 1/01*   (2024.01)
*G01V 1/30*   (2006.01)

(52) U.S. Cl.
CPC ............... *G01V 1/288* (2013.01); *G01V 1/01* (2024.01); *G01V 1/30* (2013.01)

(58) Field of Classification Search
CPC . G01V 1/288; G01V 1/01; G01V 1/30; G08B 21/10
See application file for complete search history.

(56) References Cited

U.S. PATENT DOCUMENTS

| | | | |
|---|---|---|---|
| 2004/0093172 A1* | 5/2004 | Mizushina | G01M 3/2807 702/50 |
| 2005/0280421 A1* | 12/2005 | Yomoda | G01V 1/01 324/350 |
| 2019/0122129 A1* | 4/2019 | Alsubai | G06Q 10/20 |
| 2022/0206173 A1* | 6/2022 | Roldan | G01V 1/288 |

FOREIGN PATENT DOCUMENTS

| | | | | |
|---|---|---|---|---|
| AU | 2016100644 A4 | | 9/2016 | |
| CN | 114694351 A | * | 7/2022 | ............. G01V 1/008 |
| EP | 4024090 A1 | * | 7/2022 | ............. G01V 1/008 |
| JP | 2022104811 A | * | 7/2022 | ............. G01V 1/008 |
| RU | 2737176 C1 | * | 11/2020 | ............... E02D 7/04 |
| WO | 2021232016 A1 | | 11/2021 | |

OTHER PUBLICATIONS

Translation of RU-2737176-C1 (Year: 2020).*

* cited by examiner

*Primary Examiner* — Daniel Pihulic
(74) *Attorney, Agent, or Firm* — McGlew and Tuttle, P.C.

(57) ABSTRACT

A method detects seismic events, in particular detects foreshocks for earthquake prediction. The events are detected by a plurality of sensors, wherein at least a part of a water pipe network on which the sensors are arranged is used for detection. An ultrasonic water meter to be connected to a water pipe network and an ultrasonic water meter system connected to a water pipe network are provided to detect seismic events.

19 Claims, 3 Drawing Sheets

METHOD FOR DETECTING SEISMIC EVENTS

CROSS REFERENCE TO RELATED APPLICATIONS

This application claims the benefit of priority under 35 U.S.C. § 119 of European Application 20217620.2, filed Dec. 29, 2020, the entire contents of which are incorporated herein by reference.

TECHNICAL FIELD

This invention concerns a method for detecting seismic events, in particular for detecting foreshocks for earthquake prediction and an ultrasonic water meter adapted to carry out this method.

TECHNICAL BACKGROUND

Earthquakes are sudden shaking of the ground caused by seismic waves passing through earth's rocks. These seismic waves occur when energy stored in the earth's crust is released suddenly, typically when large masses of rock pushing against each other suddenly brake and slip. Often before an earthquake occurs there are foreshocks which are related to both time and space. Those earthquakes and foreshocks generate acoustic signals in the entire spectrum: infrasounds, ultrasounds and in the audible range. It is a constant goal to anticipate such earthquakes in order to be able to warn of them in time.

AU2016100644 A4 discloses an earthquake prediction and alert system based on underground ultrasound monitoring and analysis. These systems need a large number of ultrasonic sensors distributed across a wide area. The signals of these ultrasonic sensors have to be monitored and evaluated which is a great technical effort. A further problem is that these ultrasonic sensors have to be arranged at suitable places in the earth, especially on hard rock layers, rock mass and the like, which are able to transfuse these ultrasonic waves.

SUMMARY

It is an object of the present invention to reduce the technical effort. It is a further object of the invention to have a full area coverage without any problems of acoustic coupling.

The solution according to the invention is a method for detecting seismic events, in particular for detecting foreshocks for earthquake prediction, in which method the events are detected by a plurality of sensors. According the invention at least a part of a water pipe network on which the sensors are arranged, is used for detection.

The main idea of this invention is to use a water supply network as installed in many regions of the world for water supply, such as drinking water, domestic water or industrial water. Such a water supply network consists of a network of water pipes usually leading water under pressure. The pipes are made of hard plastic or metal and they transfer any acoustic waves. Especially metal pipes are ideally suited to transfer mechanical/acoustical waves caused in the earth by seismic events. As these water pipe networks are anywhere, you can use them without any additional costs. Of course sensors for detection have to be arranged on the water pipe network, if you cannot use any sensors installed there.

Preferably, these seismic events are detected acoustically because this is the easiest way to detect them. For acoustical detecting acoustic sensors should be used.

In civilized countries there are pipe networks for supply of drinking water or domestic water. This water supply has to be paid for depending on the consumption. This is the reason why there are installed thousands of water meters in these networks. In former times mechanical water meters have been used, nowadays there are electronical water meters which send signals concerning the water consumption to concentrators by radio, where these data are further processed and evaluated. These electronical water meters are often equipped with ultrasonic sensors. These water meters are called ultrasonic water meters and they measure the consumption with for example two ultrasonic sensors in a pipe. If these ultrasonic water meters are used in the water pipe network it is particularly advantageous to use their ultrasonic sensors for detecting seismic events. There are a lot of sensors which could be used for detecting seismic events with any or only low additional costs. There may be additional costs for modifying hardware and/or software in these ultrasonic water meters. However, a big advantage will be to use the hardware and/or software which is already a part of the ultrasonic water meter and which is used for leakage detection and/or for flow rate measurement. This hardware and/or software for leakage detection in the water pipe network is an additional feature of an ultrasonic water meter which can be adapted for detecting seismic events rather simply.

Often the water pipe network extends over big distances (10 km and more) which is too big to locate the seismic event. So it may be advantageous to divide the water pipe network into areas and to allocate the ultrasonic water meters to the areas in which they are located. In this way the signals of the ultrasonic sensors in the ultrasonic water meters can be evaluated in individual areas to locate the center or the direction of the seismic events.

If ultrasonic sensors of ultrasonic water meters are used for detection there may be the problem that data of the ultrasonic water meters are transferred not continuously but at certain time intervals. This is done to save electrical energy which is very limited because of a battery which should last for sixteen years or more. For this reason it can be useful that a preevaluation of the signal of the ultrasonic sensors is implemented in the ultrasonic water meters which send preevaluated data to a concentrator. This is useful if preevaluation in the ultrasonic water meter requires less electrical energy than continuous transferring of these data to the concentrator. This can change if the technical conditions of the electrical and electronical components change.

These concentrators, which are arranged to receive data from for example 1000 ultrasonic water meters, are connected to the electrical supply network. This is the reason why the evaluation and correlation of the signals received from the ultrasonic water meters should advantageously be processed in the concentrators.

It is useful to further evaluate these signals from the ultrasonic water meters for each area and that area by area earthquake typical signal courses are used as a basis for the evaluation. These signal courses should be adapted to the geographical position and/or time sequence of the respective area.

A group of concentrators each receiving signals of a group of ultrasonic water meters are data connected to a head end system. It is advantageous if this further signal evaluation is carried out in the head end systems since all data come together there.

So using this system based on ultrasonic water meters, concentrators and head end systems it is useful to have a data preevaluation done inside the ultrasonic water meters to have a data evaluation done in the concentrators and to have a further signal evaluation done in the head end systems.

For detecting foreshocks for earthquake prediction it is important that the prediction is reliable, which means that only those detected seismic events should result in an alarm for earthquake which can be determined safely as foreshocks. For this reason according to the invention a two-stage method is used for detecting foreshocks, in a first stage signal patterns characterizing foreshocks are detected and in a second stage the detected patterns are verified. An alarm is triggered only if both stages are in conformity. For evaluation of the signals in the first stage it is advantageous to use a neural network supporting this evaluation. Often it is not really clear if a signal patterns corresponds really to a detected foreshock, this decision can be made safer through the use of a neural network. Alternatively or additionally the verification of the detected patterns can be carried out by comparison with the signals from further sensors which are not ultrasonic sensors. These sensors should be different from ultrasonic sensors, advantageously these sensors are infrasound sensors as foreshocks of earthquakes usually generate infrasound. These sensors may be accelerometers for example.

If ultrasonic water meters are used for detecting seismic events according to the prescribed method according this invention, ultrasonic water meters should be used which have been adapted to carry out this method. This means in the easiest way that there is an adaption of the software inside the meter to do this preevaluation of the detected signals. Additional there could be hardware adaption, maybe the digital electronics inside and/or a further sensor inside. This could be for example a microphone. Advantageously an infrasound sensor is installed in the ultrasonic water meter so that there are two different types of sensors, which makes the detection of foreshocks more safe.

The use of a water pipe network on which the sensors are arranged is explained in the following description based on the figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
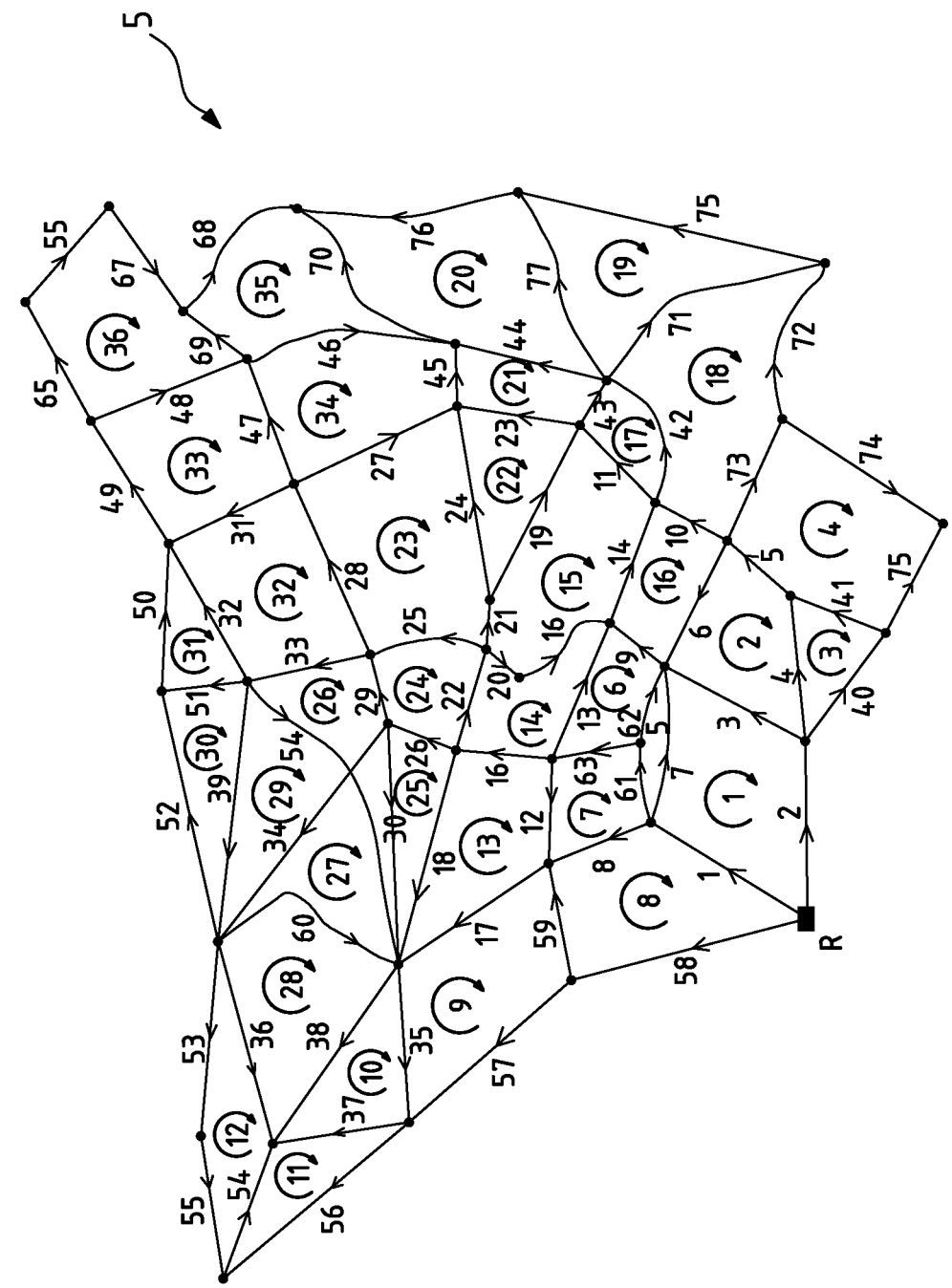
FIG. 1 is a simplified schematic representation of the expansion and complexity of a water distribution network.

Referring to the drawings, FIG. 1 shows the water mains of a typical water pipe network arranged in an area encompassing a city. The waterflow direction is shown by arrows. Each of these main water pipes supply a plurality of households each equipped with a waterflow meter of the ultrasonic sensor type. These ultrasonic water meters are well known and common, for example the water meters are of the type Kamstrup Multical®. This Kamstrup Multical CD water meter has two ultrasonic sensors inside for measuring the flow. The invention is based on a use of these ultrasonic sensors inside the flow meters for detecting seismic events.

Figure 2:
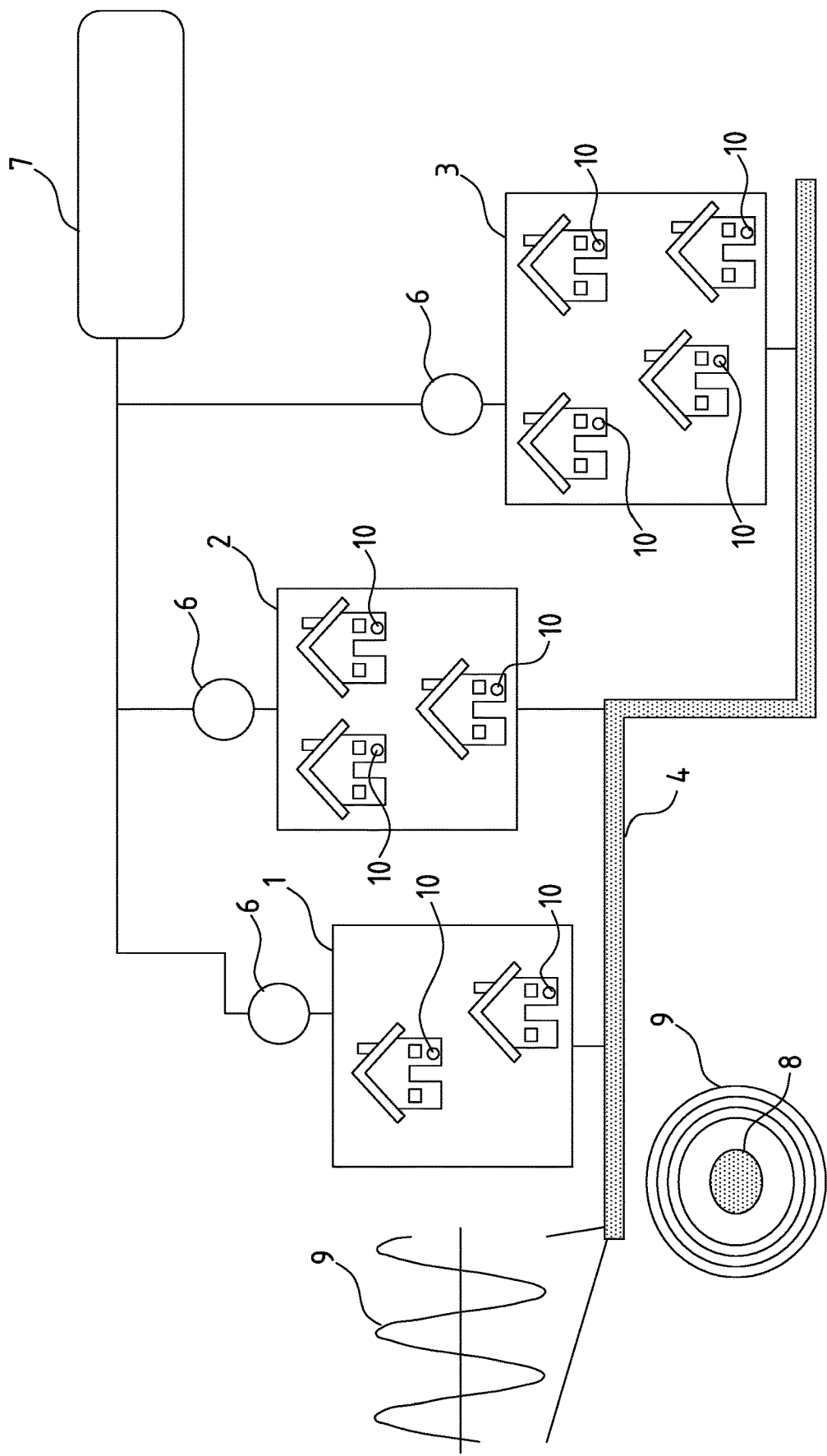
FIG. 2 is a view showing an earthquake detection system using a water pipe network.

To be able to locate seismic events these ultrasonic water meters 10 are grouped in areas. As schematically can be seen from FIG. 2, there is a first detection area 1, a second detection area 2 and a third detection area 3. They are all connected with the water pipes 4 of the water pipe network 5 which can be seen in FIG. 1. These areas may comprise up to 1000 ultrasonic water meters 10 or more which each send their data in time intervals to a concentrator 6 in which the received data are processed and evaluated. The concentrator 6 then sends the processed and evaluated data to one or more head end systems 7 where an earthquake prediction is executed as well as any alarm. A seismic event, for example a typical foreshock is symbolized at 8 in FIG. 2. This event 8 creates acoustic waves 9 which spread over the network and the area 1, 2, 3 of this network 5. These waves 9 are more or less strong depending on the distance to the center.

In each ultrasonic water meter 10 these waves 9 are detected with a strength depending of the distance of the areas 1, 2, 3 in which they are arranged. The signals 14 generated by the ultrasonic sensors T1, T2 of the ultrasonic water meter 10 are preevaluated inside the water meter with the same electronic components (comprising one or more configured processors and memory and a transceiver) C1, C2 which are used for leak detection and/or the flow rate measurement. The software is adapted accordingly. These preevaluated data are sent from the ultrasonic water meters 10 to the concentrator 6 which is assigned to a group of meters 10. In this embodiment each area 1, 2, 3 has its own concentrator 6. This is arranged here for simplifying explanation only and can be different. These concentrators 6 receive the preevaluated signals 12, 13, 14 of the water meters 10 and process and evaluate these signals. In these concentrators 6 there is the first level of pattern recognition hardware/software (one or more configured processors and memory) as well as concentrator transceivers.

The concentrators 6 send their signals to one or more head end systems 7, with one or more configured processors and memory, where the level two signal detection is done. In this head end system 7 the signal of all concentrators 6 are evaluated and it is further evaluated if these detected seismic events are a foreshock of an earthquake or not. If the latter is confirmed then an alarm will be created. This second level of detection in the head end system 7 correlates the signals of all concentrators 6 and arranges for example a plausibility check. It can further be calculated dependent on the signal strength in the arrays 1, 2, 3, the location of the center of the foreshock 8 or at least the direction where it comes from.

Additionally there may be at least some of the ultrasonic water meters 10 equipped with an infrasound sensor T3 to confirm that the detection signal 14 is of the type of a seismic event and not any external disturbance.

Figure 3:
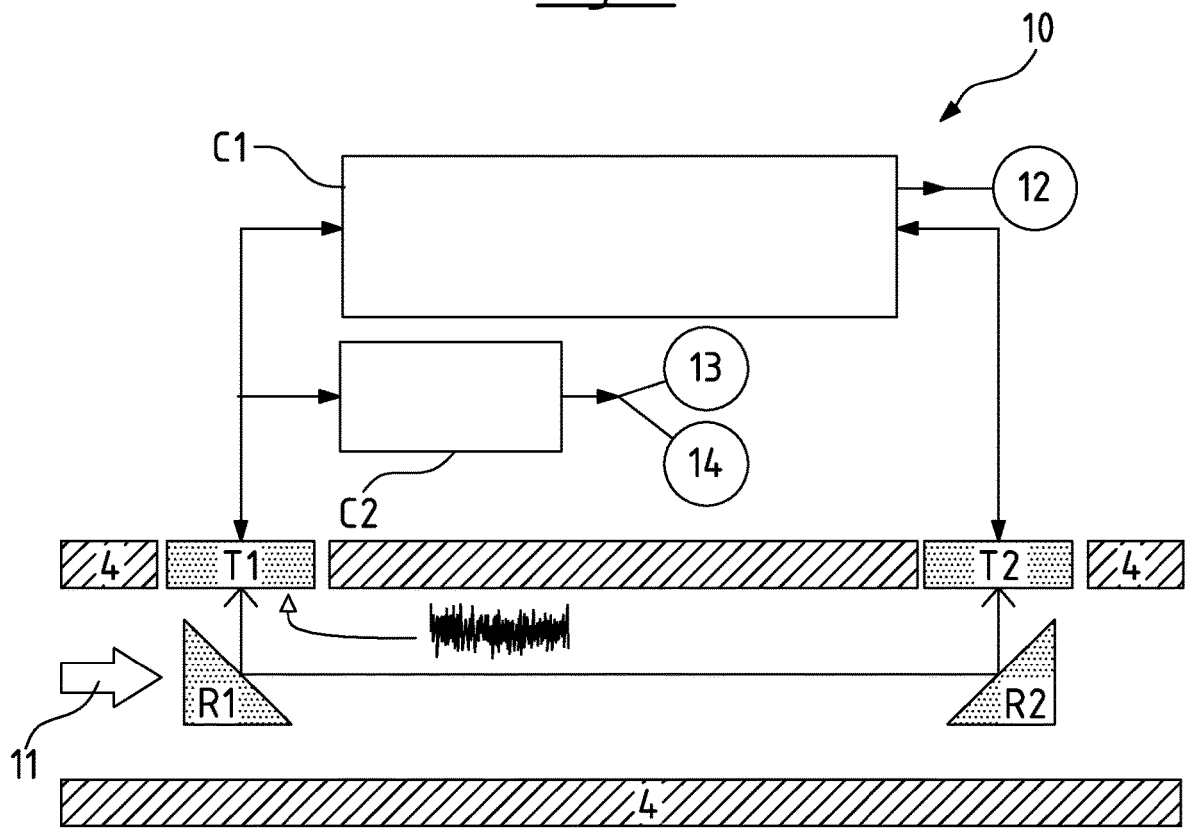
FIG. 3 is a schematic representation of the structure of an ultrasonic water meter with leak and seismic event detection.

In FIG. 3 the structure of an ultrasonic wave meter 10 is shown. This ultrasonic wave meter 10 is integrated in a water pipe 4 with flow direction 11. A part of the water pipe 4 is an integrated part of the ultrasonic water meter 10. There is a first ultrasonic sensor T1 and in a distance a second ultrasonic sensor T2 arranged in this wall. There are further a first reflector R1 assigned to the first ultrasonic sensor T1 and a second reflector R2 assigned to the second ultrasonic sensor T2. The ultrasonic sensors T1 and T2 are connected to an evaluation electronics C1 to determine flow rate and to an evaluation electronics C2 to determine leakage and seismic events. Electronics C1 send out a signal 12 corresponding to the flow rate, electronics C2 send out signals 13 and 14. Signal 13 is the leakage detection signal, signal 14 is the seismic event detection signal. These signals 12, 13, 14 which may be further processed are transmitted wirelessly to a concentrator 6 where they are further processed and transmitted to a head end system 7.

Figure 4:
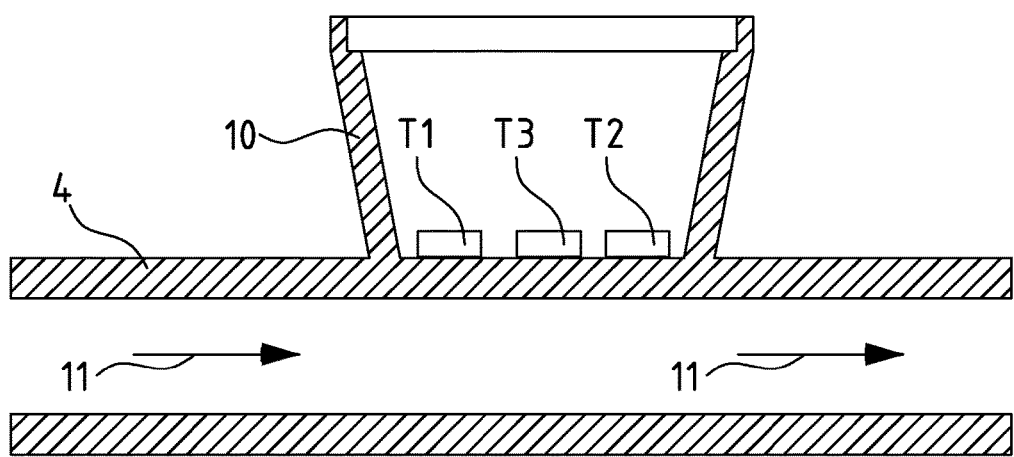
FIG. 4 is a schematic sectional view of an ultrasonic water meter with three sensors.

In FIG. 4 an ultrasonic water meter 10 is shown which is not only adapted to detect seismic events by ultrasonic sensors T1 and T2 and the evaluation electronics C1 and C2 but which has an additional sensor T3 which is an infra-sound sensor. This sensor T3 can be arranged at the wall of the pipe 4 but could alternatively be arranged at the wall of the housing of the ultrasonic water meter 10. With this infra-sound sensor T3 detected seismic events by the ultrasonic sensors T1 and T2 of the ultrasonic water meters 10 can be evaluated.

While specific embodiments of the invention have been shown and described in detail to illustrate the application of the principles of the invention, it will be understood that the invention may be embodied otherwise without departing from such principles.

LIST OF REFERENCE NUMERALS

1 First detection area
2 Second detection area
3 Third detection area
4 Water pipes
5 Water pipe network
6 Concentrator
7 Head end system
8 Foreshock
9 Wave
10 Ultrasonic water meters
11 Flow direction
12 Flow rate signal
13 Leakage detection signal
14 Seismic event signal
T1 First ultrasonic sensor
T2 Second ultrasonic sensor
T3 Infra-sound-sensor
R1 First reflector
R2 Second reflector
C1 Electronics to determine flow rate
C2 Electronics to determine leakage and seismic events

What is claimed is:

1. A method for detecting seismic events, including foreshocks, for earthquake prediction, the method comprising:
arranging a plurality of sensors on at least a part of a water pipe network, wherein the sensors are acoustic sensors, the sensors comprise ultrasonic sensors and the ultrasonic sensors are respectively provided in ultrasonic water meters for seismic event detection; and
detecting events acoustically by the plurality of sensors.

2. A method according to claim 1, wherein:
the ultrasonic water meters comprise hardware and/or modified software that detects the seismic events; and
the hardware and/or software of the ultrasonic water meters is configured and set up for leakage detection and/or flow rate measurement with the ultrasonic water meters.

3. A method according to claim 1, wherein:
the pipe network is divided into areas; and
the ultrasonic water meters are allocated to the respective areas in which the ultrasonic water meters are located.

4. A method according to claim 1, wherein:
a preevaluation of the signal of the sensors is implemented in the ultrasonic water meters to form preevaluated data; and
the ultrasonic water meters send the preevaluated data to a concentrator connected to the ultrasonic water meters.

5. A method according to claim 4, wherein the concentrator provides an evaluation and correlation of the signals received from the ultrasonic water meters.

6. A method according to claim 5, wherein:
a further signal evaluation is carried out area by area; and
area by area earthquake signal courses, adapted to the geographical position and/or time sequence of the respective area, are provided as a basis for the further signal evaluation.

7. A method according claim 6, wherein the further signal evaluation is carried out in a head end system which is data connected to a group of concentrators.

8. A method according to claim 1, wherein a two-stage method is used for detecting foreshocks comprising:
in a first stage detecting signal patterns characterizing foreshocks;
in a second stage verifying detected patterns; and
subsequent to verifying detected patterns, triggering an alarm.

9. A method according to claim 8, wherein the first stage of detecting foreshocks is carried out using a neural network.

10. A method according to claim 8, wherein the verification is carried out by means of a further signal from non-ultrasonic sensors.

11. A method according to claim 8, further comprising providing infra-sound sensors wherein the verification is carried out based on further signals from the infra-sound sensors.

12. An ultrasonic water meter to be connected to a water pipe network, the ultrasonic water meter comprising:
an ultrasonic sensor detecting events acoustically in the water pipe network and outputting a sensor signal based on the acoustic detection; and
electronic components configured for receiving the sensor signal and providing preevaluated data, based on the sensor signal, as an output for seismic event detection related to detected seismic events, including foreshocks, for earthquake prediction.

13. An ultrasonic water meter according claim 12, further comprising a microphone arranged in or at the water meter.

14. An ultrasonic water meter according claim 13, wherein the microphone comprises an infra-sound sensor.

15. An ultrasonic water meter according claim 12, wherein electronic components are further configured for leak detection and/or the flow rate measurement with respect to the a water pipe network.

16. An ultrasonic water meter system connected to a water pipe network, the system comprising:
a plurality of ultrasonic water meters connected to the water pipe network at locations of respective areas of the water pipe network, each of the ultrasonic water meter comprising:
an ultrasonic sensor detecting events acoustically in the water pipe network and outputting a sensor signal based on the acoustic detection; and
electronic components configured for receiving the sensor signal and implementing a preevaluation of the sensor signal to provide preevaluated data, based on the sensor signal, as an output for seismic event detection related to detected seismic events, including foreshocks, for earthquake prediction.

17. An ultrasonic water meter system according to claim 16, further comprising a concentrator connected to the ultrasonic water meters, wherein:
the ultrasonic water meters are configured to send the preevaluated data to the concentrator; and
the concentrator is configured to provide an evaluation and correlation of the signals received from the ultrasonic water meters as a concentrator output.

18. An ultrasonic water meter system according to claim 17, further comprising a head end system configured to receive the concentrator output and carry out a further signal evaluation area by area and to provide area by area earthquake signal courses, adapted to the geographical position and/or time sequence of the respective area, as a basis for the further signal evaluation.

19. An ultrasonic water meter system according to claim 18, wherein a two-stage method is used for detecting foreshocks comprising:
in a first stage detecting signal patterns characterizing foreshocks; and
in a second stage verifying detected patterns; and
subsequent to verifying detected patterns, triggering an alarm.

* * * * *